United States Patent [19]
Shetty et al.

[11] Patent Number: 5,451,449
[45] Date of Patent: Sep. 19, 1995

[54] COLORED IRIDESCENT FILM

[75] Inventors: Ramakrishna S. Shetty, Pelham; Scott A. Cooper, Yorktown Heights, both of N.Y.

[73] Assignee: The Mearl Corporation, N.J.

[21] Appl. No.: 240,903

[22] Filed: May 11, 1994

[51] Int. Cl.6 .............................................. B32B 3/00
[52] U.S. Cl. ..................................... 428/195; 428/204; 428/212; 428/213; 428/480; 428/483
[58] Field of Search ................ 264/171; 428/195, 212, 428/213, 913, 914, 204, 480, 483

[56] References Cited

U.S. PATENT DOCUMENTS

| | | | |
|---|---|---|---|
| 3,711,176 | 1/1973 | Alfrey, Jr. et al. | 350/1 |
| 3,801,429 | 4/1974 | Schrenk et al. | 161/181 |
| 4,162,343 | 7/1979 | Wilcox et al. | 428/212 |
| 4,310,584 | 1/1982 | Cooper et al. | 428/212 |
| 4,937,134 | 6/1990 | Schrenk et al. | 428/213 |
| 5,089,318 | 2/1992 | Shetty et al. | 428/212 |
| 5,149,578 | 9/1992 | Wheatley et al. | 428/213 |
| 5,269,995 | 12/1993 | Ramanathan et al. | 264/171 |

*Primary Examiner*—Patrick J. Ryan
*Assistant Examiner*—William A. Krynski
*Attorney, Agent, or Firm*—Ostrolenk, Faber, Gerb & Soffen

[57] ABSTRACT

Disclosed is a transparent thermoplastic resinous film of at least 10 generally parallel layers in which the contiguous adjacent layers are of diverse transparent thermoplastic resinous material differing in refractive index by at least about 0.03, the film containing a sufficient quantity of a transparent dye which is soluble in the thermoplastic resinous material of the layers in which it is located to enhance or modify the apparent color of at least one of the reflection and transmission colors of the film.

11 Claims, No Drawings

COLORED IRIDESCENT FILM

BACKGROUND OF THE INVENTION

The present invention relates to multilayer coextruded light-reflecting films which have a narrow reflection band due to light interference. When the reflection band occurs within the range of visible wavelength, the film is iridescent. Similarly, when the reflection band falls outside the range of visible wavelength, the film is either ultraviolet or infrared reflecting. Such multilayer films and methods by which they can be produced are known in the art. They are described, for instance, in U.S. Pat. Nos. 3,565,985, 3,759,657, 3,773,882 and 3,801,429 and other patents.

The multilayer films are composed of a plurality of generally parallel layers of transparent thermoplastic resinous material in which the contiguous adjacent layers are of diverse resinous material whose index of refraction differs by at least about 0.03. The film contains at least 10 layers and more usually at least 35 layers and, preferably, at least about 70 layers.

The individual layers of the film are very thin, usually in the range of about 30 to 500 nm, preferably about 50–400 nm, which causes constructive interference in light waves reflected from the many interfaces. Depending on the layer thickness and the refractive index of the polymers, one dominant wavelength band is reflected and the remaining light is transmitted through the film. The reflected wavelength is proportional to the sum of the optical thickness of a pair of layers.

The quantity of the reflected light (reflectance) and the color intensity depend on the difference between the two refractive indices, on the ratio of optical thicknesses of the layers, on the number of layers and on the uniformity of the thickness. If the refractive indices are the same, there is no reflection at all from the interfaces between the layers. In multilayer iridescent films, the refractive indices of contiguous adjacent layers differ by at least 0.03 and preferably by at least 0.06 or more. For first order reflections, reflectance is highest when the optical thicknesses of the layers are equal, although suitably high reflectances can be achieved when the ratio of the two optical thicknesses falls between 5:95 and 95:5. Distinct color reflections are obtained with as few as 10 layers. However, for maximum color intensity it is desired to have been 35 and 1,000 or even more layers. High color intensity is associated with a reflection band which is relatively narrow and which has high reflectance at its peak. It should be recognized that although the term "color intensity" has been used here for convenience, the same considerations apply to the invisible reflection in the ultraviolet and infrared ranges.

The multilayer films can be made by a chill-roll casting technique using a conventional single manifold flat film die in combination with a feedblock which collects the melts from each of two or more extruders and arranges them into the desired layer pattern. Feedblocks are described for instance in U.S. Pat. Nos. 3,565,985 and 3,773,882. The feedblocks can be used to form alternating layers of either two components (i.e. ABAB . . . ); three components (e.g. ABCABCA . . . or ACBCACBC . . . ); or more. The very narrow multilayer stream flows through a single manifold flat film die where the layers are simultaneously spread to the width of the die and thinned to the final die exit thickness. The number of layers and their thickness distribution can be changed in inserting a different feedblock module. Usually, the outermost layer or layers on each side of the sheet are thicker than the other layers. This thicker skin may consist of one of the components which makes up the optical core; may be a different polymer which is utilized to impart desirable mechanical, heat sealing, or other properties; or may be a combination of these.

Some recent developments in the iridescent film are described in U.S. Pat. Nos. Re. 31,780; 4,937,134; and 5,089,318. U.S. Pat. No. Re. 31,780 describes using a thermoplastic terephthalate polyester or copolyester resin as the high refractive index component of the system. Formation of elastomeric interference films are described in U.S. Pat. No. 4,937,134 in which all of the resinous materials are certain thermoplastic polyurethanes, polyester block amides or flexible copolyesters. U.S. Pat. No. 5,089,318 discloses improved multilayer light-reflecting transparent thermoplastic resinous film of at least 10 generally parallel layers in which the contiguous adjacent layers are of diverse transparent thermoplastic resinous material differing in refractive index by at least about 0.03 and at least one of the resinous materials being an engineering thermoplastic elastomer resin.

It has been desired to incorporate color into these iridescent films in order to add a new dimension to their appearance. Such colors can enhance or change the reflection or transmission colors of the iridescent film. In addition, while iridescent colors change with the viewing angle, the non-iridescent colors remain the same and hence the colors that can be observed can and will change dramatically based on the combination of the iridescent and non-iridescent component. Unfortunately, incorporation of the non-iridescent color into the iridescent film has proven to be elusive. In discussing colorants for plastics it is important to make a distinction between dyes and pigments. Under the prevailing processing conditions, pigments are virtually insoluble in plastics, whereas dyes are soluble.

Attempts to incorporate various pigments, both of a pearlescent and non-pearlescent nature, did not give rise to satisfactory results. It is now believed that the reason for these poor results was due to one or more of the following reasons: For the first order colors, which are the brightest, the layers in the optical core of the film usually have a thickness of about 0.03 to 0.2 micron while the pigment particle size is usually in the range of about 0.3 micron. This means that the pigments are larger than the layers and their use disrupts the interfaces between the layers which in turn results in the loss of iridescence and light scattering. The use of pigments whose particle size is less than that of the layer thickness in the optical core has resulted in agglomeration and aggregation during processing of the film resulting in the formation of a color body whose particle size was greater than the optical core layer thickness. In those instances in which such aggregation did not occur, one of two equally undesirable results was encountered. Either the pigment concentration was inadequate to realize any significant effect or when the pigment was incorporated in a concentration sufficient to contribute significantly to the appearance of the final film, the characteristics of the resin had been changed to such an extent that a co-extruded film could not be made. An attempt to overcome this problem was made by incorporating the pigment into the skin layer of the film which typically was in the range of 3 to 7 microns in thickness and comprised 20 to 25% of the total film thickness. Here also, up to a given pigment concentration, the contribution of the pigment was inadequate and was overpowered by the iridescent colors so the film appeared as if no pigment had been added and when this concentration was exceeded, the loading levels were found to be too high for the resins to be drawn down to be cast into film.

It has now been discovered that the foregoing problem can be overcome if a transparent dye having certain characteristics is incorporated into the resinous material of the layers.

SUMMARY OF THE INVENTION

This invention relates to an improved colored multilayer light-reflecting film and more particularly to a transparent thermoplastic resinous film of at least 10 generally parallel layers in which the contiguous adjacent layers are of diverse transparent thermoplastic resinous material differing in refractive index by at least about 0.03, the film containing a sufficient quantity of a transparent dye which is soluble in the thermoplastic resinous material of the layers in which it is located to enhance or modify the apparent color of at least one of the reflection and/or transmission colors of the film.

DETAILED DESCRIPTION OF THE INVENTION

In accordance with the present invention, the iridescent film of the prior art is improved by incorporating certain dyes therein.

The present invention is applicable to all of the multilayer films which heretofore exist. Those films are composed of a plurality of generally parallel layers of transparent thermoplastic resinous material in which the contiguous adjacent layers are of diverse resinous materials whose index of refraction differs by at least about 0.03 and preferably 0.06. These films contain at least 10 layers, or usually at least 35 layers, and preferably at least 70 layers. The individual layers of the film are very thin, usually in the range of about 30 to 500 nm, and preferably about 50 to 400 nm.

The multilayer films are usually made by a chill-roll casting technique in which melts of the thermoplastic resinous material from two or more extruders are collected by a feedblock which arranges them into a desired layered pattern. The very narrow multilayer stream flows through a single manifold flat film die with the layers simultaneously spread to the width of the die and thinned to the final die exit thickness. The number of layers and their thickness distribution can be changed by using a different feedblock module. Usually, the outermost layer or layers on each side of the sheet is thicker than the other layers so as to form a relatively thick skin. The resinous material used to form the skin may be one of the components which makes up the optical core, or a different polymer which is utilized to impart a desirable mechanical, heat sealing or other property, or a combination of these.

In accordance with the invention, a colorant is added to one or more of the resinous materials in an amount which is sufficient to result in an enhancement or in a change of at least one of the reflection colors of the film or one of the transmission colors of the film, or both, relative to the same characteristic present when the colorant is not used. The colorant can be incorporated in all or less than all of the layers of the optical core and/or in all or less than all of the skin layers. The number of layers in which the colorant is incorporated and the concentration of the colorant in an individual layer is a function of the desired color effect.

In order to be useful in the present invention, the colorant must have three characteristics. First, it must be transparent in the sense that the iridescent characteristics of the film in the absence of the colorant are not substantially interfered with, i.e. the iridescent appearance of the film is not significantly changed. Second, the colorant must be soluble in the thermoplastic resinous material in which it is incorporated. That means that pigmentary colorants can not be used. Third, the colorant must be stable under the process conditions used to form the film. Stability refers not only to the color of the dye but also means the dye must be non-migratory and non-volatile at the temperatures encountered during formation of the film which typically range up to about 300° C., and usually about 200°–260° C.

Among the dyes which can be employed in the present invention, those that are soluble in aliphatic and aromatic compounds are of special interest. In general, azo dyes, anthraquinone dyes, pyrazolone derivatives and pyridone dyes are suitable for use in the present invention. There are a variety of fluorescent dyes which can also be incorporated into plastics for use in the present invention.

While the foregoing dyes are among the preferred, it will be appreciated that other dyes can also be used as long as they have the three characteristics noted above. It will also be appreciated that a film may contain different dyes in the individual layers of the optical core since a dye which is soluble in the thermoplastic resinous material of one of the layers may lack one or more of the required characteristics when incorporated into the resinous material of the adjacent contiguous layer.

Whether or not any particular dye satisfies the three necessary conditions can readily be determined by conducting a short test procedure combining the dye with the resinous material and observing the resulting characteristics. The manner in which the dye and the resinous thermoplastic material are combined does not form a part of the present invention and any convenient procedure can be employed.

The properties of iridescent films are such that for a given reflection color the films have a unique transmission color. For example, a red reflection color has a blue transmission color, a green reflection color has a pink transmission color, a blue reflection color has a yellow transmission color, and so on. Incorporation of a transparent dye will either enhance and/or change the reflection and/or transmission colors. A red dye will enhance the reds in a red reflecting iridescent film and change the blue transmission color to purple or magenta depending on the concentration of the red dye. Similarly, a red dye will change the blue in a blue reflecting iridescent film to purple or magenta, and change the yellow transmission color to an orange. Similar changes will occur with different combinations of dyes and reflection or transmission colors of the iridescent films. Different colored dyes may be used in the different components of the iridescent films and the result will be similar to combining the dyes. Red dye used in one of the component and a yellow dye used in another component of the iridescent film will result in an effect similar to using an orange dye.

The amount of dye that can be incorporated into a thermoplastic resinous material is only limited by the amount that can be solubilized in the thermoplastic resinous material and can be processed at the prevailing processing conditions without migrating or volatilizing. The amount of dye that is incorporated into the thermoplastic resinous material depends on the effect desired. Very low concentrations of dye will result in an iridescent film with a light tint or a pastel color highlight. High concentrations of dyes will result in strong contributions of the dye to the final appearance of the iridescent film.

In order to illustrate the present invention, various examples are set forth below and it will be appreciated that these examples are not intended to limit the invention. Unless otherwise stated, all temperatures are in degree Centigrade and all parts and percentages are by weight throughout this specification and claims.

EXAMPLE 1

Polyethylene terephthalate thermoplastic polyester (PET) was fed to the feedblock from one extruder and polymethyl methacrylate (PMMA) from a second extruder to form a 115 layer optical core, and a second skin layer of polybutylene terephthalate was added to each surface by means of a third extruder to form a 0.75 mil (19 micron) thick iridescent film. The film was brightly iridescent and was prevailing red when seen by reflection at perpendicular incidence, and blue when seen by transmission at perpendicular incidence.

The foregoing procedure was repeated except that a red pyridone dye was incorporated into the PMMA at a concentration of about 0.7%. This dye was transparent, soluble in the PMMA, and stable under the processing conditions (being non-migratory and non-volatile at the maximum temperature encountered during the processing of the film at about 260° C). The resulting film was brightly iridescent, the red reflection colors were enhanced by the red dye, the blue transmission colors changed to purple, and the film had a red hue.

EXAMPLE 2

A multilayer structure with the same polymers in the optical core as in Example 1 was prepared except that the optical core had 229 layers and the two outer skin layers added by means of a third extruder were polyethylene terephthalate (PET). The resulting film was 1.40 mils (35.5 microns) in thickness and had more intense iridescent colors than the film in Example 1 because of the increased number of layers in the optical core. The addition of the red dye resulted in the red reflection colors to be enhanced, and changed the blue transmission colors to purple.

EXAMPLES 3-6

| Example | Total No. of Layers | High Index Polymer | Low Index Polymer | Skin Layer(s) Polymer |
| --- | --- | --- | --- | --- |
| 3 | 117 | PET | PMMA | PBT w/red dye |
| 4 | 117 | PET w/red dye | PMMA | PBT |
| 5 | 231 | PET | PMMA | PBT w/red dye |
| 6 | 231 | PET w/red dye | PMMA | PBT |

EXAMPLES 7-30

All the above six examples were repeated with different film thickness to obtain the following reflection colors at perpendicular incidence: blue/violet, blue/green, red/green and red/yellow.

EXAMPLES 31-60

Examples 1 to 24 were repeated with a blue anthraquinone dye at a concentration of about 0.4%.

EXAMPLES 61-90

Examples 1 to 24 were repeated with a combination of a green anthraquinone dye and a yellow pyrazolone dye at a concentration of 0.15%.

EXAMPLES 91-92

Examples 1 and 2 were run with a yellow pyrazolone dye at a concentration of 0.6% with an iridescent film which was red and yellow when seen by reflection at perpendicular incidence.

EXAMPLE 93

Example 2 was run with a black chrome complex dye at a concentration 6% with an iridescent film which was red and yellow when seen by reflection at perpendicular incidence.

Various changes and modifications can be made in the present invention without departing from the spirit and scope thereof. The above examples show films made with combinations of PBT, PET and PMMA, and with the dye incorporated into one of the components. The dyes can be incorporated into any thermoplastic resinous material that can be used to make an iridescent film as long as the three necessary conditions for the use of the dyes are satisfied. The dyes can also be incorporated into more than one component of the iridescent film and it is possible for all components in the iridescent film to contain dyes. It will also be appreciated that while the invention has been described with reference to the cast, flat film type of film production, iridescent films can also be made by the tubular (blown film) process. Accordingly, the various embodiments disclosed herein were for the purpose of illustration only and were not intended to limit the invention.

What is claimed is:

1. A transparent thermoplastic resinous laminate film of at least 10 very thin layers of substantially uniform thickness of about 30 to 500 nm, said layers being generally parallel and one surface of each of two of said layers constituting the outermost surfaces of the laminate film, the contiguous adjacent layers being of different transparent thermoplastic resinous materials, the contiguous adjacent layers differing in refractive index by at least about 0.03, and the film containing a sufficient quantity of a stable transparent dye which is soluble in the thermoplastic resinous material of the layers in which it is located to enhance or modify the apparent color of at least one of the reflection and/or transmission colors of the film.

2. The transparent thermoplastic laminate film of claim 1 wherein each of the outermost surfaces of laminate film have a skin laminated thereto, said skin being a layer of transparent thermoplastic resinous material of substantially uniform thickness and each skin being at least 5% of the total thickness of the film and skins.

3. The transparent thermoplastic resinous laminate film of claim 2, wherein the skin comprises polyethylene terephthalate or polybutylene terephthalate.

4. The transparent thermoplastic resinous laminate film of claim 1 having at least 35 layers.

5. The transparent thermoplastic resinous laminate film of claim 4 having at least about 70 layers.

6. The transparent thermoplastic resinous laminate film of claim 5 wherein said adjacent resinous material has a refractive index which is lower by at least about 0.06.

7. The transparent thermoplastic resinous laminate film of claim 1 wherein one of the thermoplastic resinous materials is polyethylene terephthalate.

8. The transparent thermoplastic resinous laminate film of claim 7 wherein one of the thermoplastic resinous materials is polymethyl methacrylate.

9. The transparent thermoplastic resinous laminate film of claim 7 having at least 70 substantially uniformly thick layers.

10. The transparent thermoplastic resinous laminate film of claim 1 in which the dye is present in each of the different thermoplastic resinous materials.

11. The transparent thermoplastic resinous laminate film of claim 1 in which the dye is present in less than all of the different transparent thermoplastic resinous materials.

* * * * *